UNITED STATES PATENT OFFICE.

WATSON S. GRAY AND FOREST W. GRAY, OF PHILADELPHIA, PA.

IMPROVEMENT IN FIRE AND WATER PROOF COMPOSITIONS.

Specification forming part of Letters Patent No. 163,373, dated May 18, 1875; application filed April 16, 1875.

*To all whom it may concern:*

Be it known that we, WATSON S. GRAY and FOREST W. GRAY, both of the city and county of Philadelphia, and State of Pennsylvania, have invented a new and useful Improvement in a Fire and Water Proof Compound; and we do hereby declare the following to be a clear and exact description of the nature thereof, sufficient to enable others skilled in the art to which our invention appertains to fully understand, make, and use the same.

The following formula will be observed in making one barrel, or about forty gallons of the compound: coal-tar, twenty-eight gallons; rosin, ground or broken fine, five pounds; dead-oil, four gallons; silicate of soda, ten pounds; boiling water, two gallons; shellac-varnish, two gallons; air-slaked lime, twenty-five pounds; soap-stone, pulverized, ten pounds; sulphate of iron, five pounds.

In lieu of the dead-oil, we may use benzine or other hydrocarbon. In lieu of silicate of soda, we may use soda-ash, caustic potash, or any other alkaline substance. In lieu of air-slaked lime, we may use dry clay. In lieu of soap-stone, we may use marble-dust, ground ore, brick-dust, or any equivalent substance that will answer for the purpose therein specified.

The rosin is dissolved in the oil and the alkali and sulphate of iron in the boiling water. The tar is added to the rosin solution; then we combine therewith, respectively, the air-slaked lime, alkaline solution, soap-stone, sulphate-of-iron solution, and varnish, stirring well as each ingredient is added.

The coal-tar possesses advantages as follows: First, it is a convenient and cheap material to form the basis of the compound; second, it has excellent water-proof qualities; third, it assists the other ingredients in forming a substantial and durable body. The dead-oil or benzine reduces and cuts the tar.

Rosin has, first, cementing properties for assisting the tar in firmly combining and holding together the other ingredients; second, water-proof qualities.

The air-slaked lime or dry clay and soap-stone, marble-dust, ground ore, or brick-dust form a heavy, durable, and substantial body.

Alkalies intermix the coal-tar with all the other ingredients, are fire-proof and eminently neutralize the acid of the coal-tar.

We use the varnish essentially as a drier, a vehicle for the union of the other ingredients, and producer of a solid, durable, and handsome, glossy surface.

Sulphate of iron is fire-proof and most preservative in its nature.

The proportions of the compound may be varied to suit conditions of the tar in warm and cold climates, and the consistency thereof may be regulated by varying the quantity of oil, benzine, or other hydrocarbon used.

When it is desired to letter or paint over or on the compound with fine colors, we employ a sizing consisting of shellac, three pounds, dissolved in alcohol, one gallon, so as to prevent the tar mixing with the colors.

If the compound is applied in a heated state, it will penetrate deeper into wood, and produce a much higher gloss than when applied cold.

Having thus described our invention, what we claim as new, and desire to secure by Letters Patent, is—

The compound or composition of matter consisting of the ingredients herein set forth, and for the purpose specified.

WATSON S. GRAY.
FOREST W. GRAY.

Witnesses:
JOHN A. WIEDERSHEIM,
A. P. GRANT.